United States Patent [19]

Repperger

[11] Patent Number: 5,062,594
[45] Date of Patent: Nov. 5, 1991

[54] FLIGHT CONTROL SYSTEM WITH TACTILE FEEDBACK

[75] Inventor: Daniel W. Repperger, Vandalia, Ohio

[73] Assignee: The United States of America as represented by the Secretary of the Air Force, Washington, D.C.

[21] Appl. No.: 624,096

[22] Filed: Nov. 29, 1990

[51] Int. Cl.$^5$ .................. G05D 01/00; B64C 13/46
[52] U.S. Cl. .................................. 244/175; 244/195; 244/223; 364/434
[58] Field of Search ............ 364/433, 434; 244/223, 244/175, 177, 178, 181, 191, 194, 195; 340/705; 350/172; 358/103; 352/132

[56] References Cited

U.S. PATENT DOCUMENTS

| | | | |
|---|---|---|---|
| 3,488,427 | 6/1970 | Anthony | 364/434 |
| 3,920,966 | 11/1975 | Knemeyer et al. | 235/150 |
| 4,092,716 | 5/1978 | Berg et al. | 244/195 |
| 4,373,184 | 2/1983 | Lambregts | 364/434 |
| 4,477,043 | 10/1984 | Bepperger | 244/223 |
| 4,578,562 | 3/1986 | Lindstrom et al. | 219/125.1 |
| 4,632,341 | 12/1986 | Bepperger et al. | 244/230 |
| 4,800,721 | 1/1989 | Cemenska et al. | 60/393 |
| 5,016,177 | 5/1991 | Lambregts | 244/181 |

Primary Examiner—Joseph F. Peters, Jr.
Assistant Examiner—Virna Lissi Mojica
Attorney, Agent, or Firm—Gerald B. Hollins; Donald J. Singer

[57] ABSTRACT

A control system for an aircraft or other man-machine system wherein the usual visual feedback system is characterized and is optimally supplemented by a secondary feel oriented feedback arrangement in which input signals are derived from either of two supplementary feedback signal sources and the resulting algorithms characterized mathematically. The disclosure includes several exemplary arrangements of the feedback systems in which some of the input parameters are of selected value. Mathematical characterization of the feedback paths is used.

9 Claims, 9 Drawing Sheets

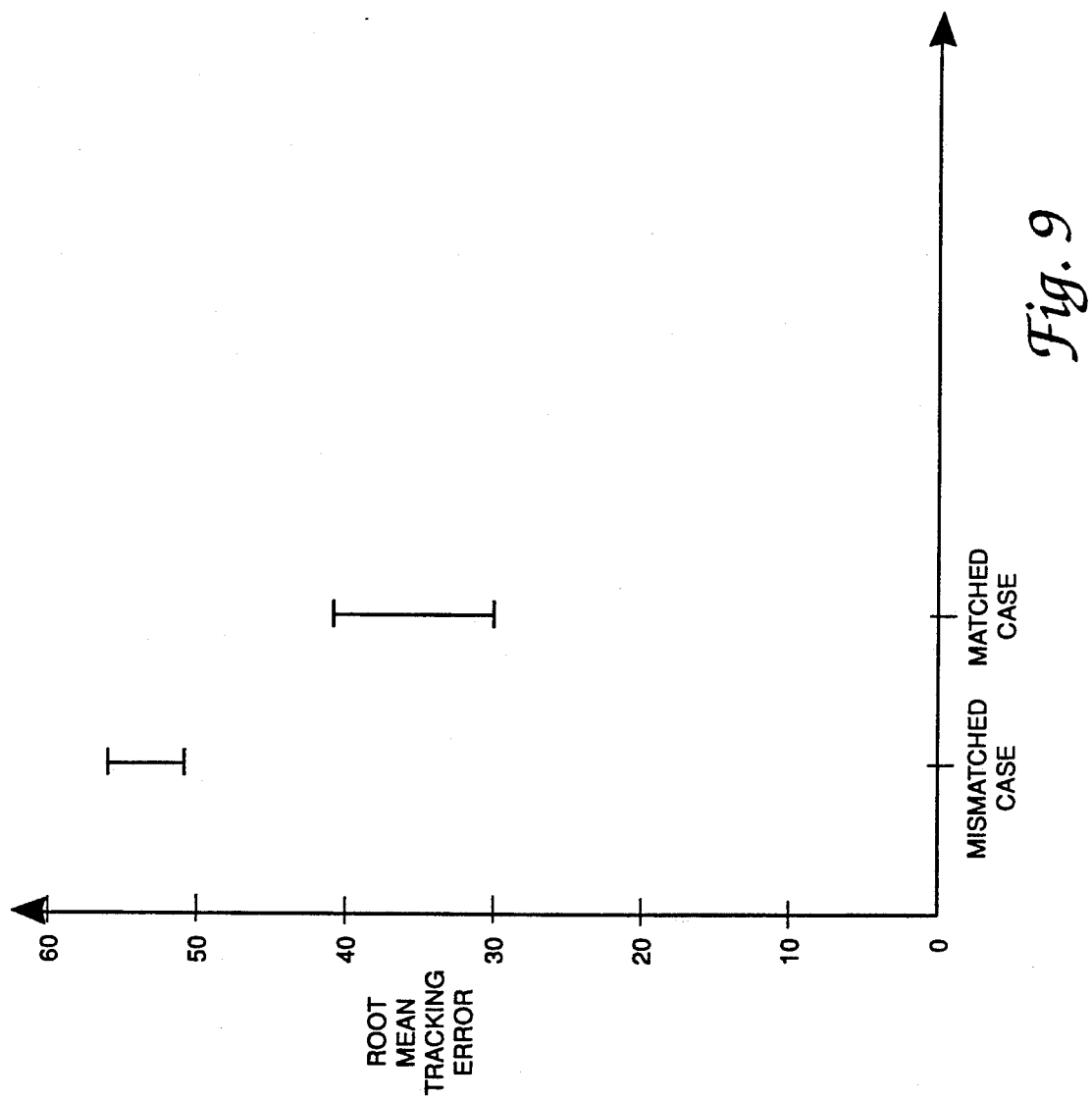

FLIGHT CONTROL SYSTEM WITH TACTILE FEEDBACK

RIGHTS OF THE GOVERNMENT

The invention described herein may be manufactured and used by or for the Government of the United States for all governmental purposes without the payment of any royalty.

BACKGROUND OF THE INVENTION

This invention relates to the field of man to machine interfacing as applied to the human controlling of an aircraft in response to external conditions.

The use of parallel stimuli or dual input channels to a human operator is widely recognized in the psychology of learning to provide faster comprehension of newly presented or rapidly changing input data and to reduce the error in human performance responsive to this data. The combination of sight and sound, for example, is often used in the academic classroom for increased rates of student comprehension. Similarly, the combination of feeling and sound are well known to be relied upon by sightless persons in discerning information—even information frequently overlooked by other persons exposed to the same environment.

Of current interest with respect to information comprehension is a problem in the field of vehicle control. This problem may include automotive, marine, and aircraft vehicles but is especially concerned with the high speed tactical or fighter aircraft. The foundation of this problem concerns the amount of information to be received and digested by an operator and the fact that the amount of available information is becoming so large as to be overwhelming and limiting in features that can be added to the vehicle.

Although the concept of providing feel or feedback to the controls of an aircraft or other man-machined system has been known for sometime, the source of the information fedback to the human operator in such systems has been the subject of considerable diversion, experimentation, and disagreement in the art. In the present invention, however, a physical reinforcement feel signal is added to the visual information sourced signal provided by a human operator such as an aircraft pilot. This information is added to the aircraft controls, specifically the aircraft control stick in order to increase the rate of flight information comprehension and improve the efficiency of the interface between aircraft pilot and flight control system.

The patent art includes several examples of control systems which are used in aircraft or industrial systems and which involve some degree of information feedback. Included in these patents are U.S. Pat. No. 3,920,966 issued to Siegfried Kenemeyer et al; U.S. Pat. No. 4,477,043 issued to the present inventor, Daniel Repperger; U.S. Pat. No. 4,578,562 issued to Lars Lindstom et al; U.S. Pat. No. 4,632,341 also issued to Daniel W. Repperger et al; and U.S. Pat. No. 4,800,721 issued to R.A. Camenska et al, and U.S. (Ser. No. 079,323) also in name of Daniel W. Repperger. Although these patents indicate prior inventive effort in the area of feedback controls systems, especially as applied to aircraft, none of these inventions achieves the advantage of reinforcing a visual image perception or an error condition with related tactile information.

SUMMARY OF THE INVENTION

The present invention provides a two feedback path arrangement for an aircraft or other vehicle in which the primary path transfer function, the transfer function involving the human pilot, is matched by the transfer function which involves a secondary feedback path. The secondary path may be embodied in one or two alternate forms in which a position signal is transferred into a force output signal.

It is an object of the present invention therefore to provide a vehicle control system in which the primary position feedback loop involving a human pilot is supplemented by a secondary or force feedback loop.

It is another object of the invention to provide a human operator with an additional input model of the task he is tracking.

It is another object of the invention to provide a controller apparatus in which the relationship between control stick output and the force input to the same control stick is made to illustrate the task being tracked.

It is another object of the invention to provide a human operator pilot with a cause-effect relationship in the forces observed at the aircraft stick controller.

It is another object of the invention to provide a vehicle control system in which a force feedback loop may be operated from either of two position signal inputs.

It is another object of the invention to provide a vehicle control system in which a match between the primary position feedback loop and the secondary force feedback loop is achieved.

It is another object of the invention to provide a two feedback path control system for an aircraft that is subject to random noise buffeting of the type generally produced by wind gusting.

It is another object of the invention to provide an environment in which a human operator or pilot can learn an aircraft controlling task more quickly.

Additional objects and features of the invention will be understood from the following description and claims and the accompanying drawings.

These and other objects of the invention are achieved by an aircraft flight system providing the aircraft pilot with tactile flight control information that is secondarily supplementing to the normal visual primary flight controlling information comprising the combination of a first pilot vision based and noise input forcing function $F_D(t)$ signal inclusive closed feedback loop aircraft dynamics plant controlling apparatus, said apparatus including: an aircraft dynamics plant means output, $\theta(t)$ signal, to target input forcing function, $F_T(t)$ signal, difference error based visual display having an $\theta(t)$ plant position signal display output to said pilot; a human operator force and secondary information tactile feedback force operated control stick including a predetermined stick mechanical impedance characteristic and integration means for converting a stick velocity signal to a stick position signal, and aircraft dynamics plant means for generating said output $\theta(t)$ signal, said aircraft dynamics plant means also including said $F_D(t)$ noise disturbance input forcing signal as an input signal component thereto; a secondary information tactile signal feedback path having said aircraft dynamics plant means output $\theta(t)$ signal and said control stick position output signal as inputs thereof; and a force signal output therefrom that is connected with said control stick, and a transfer function defined by the mathematical relationship.

$$1/P^N (1/P - s \cdot S\ IMP)$$

wherein P represented the aircraft dynamics plant transfer function.
N represents a feedback determination variable having possible values of zero and one,
s represents the LaPlace Transform operator, and
S IMP represents the impedance of said control stick.

BRIEF DESCRIPTION OF THE DRAWINGS

FIG. 9 shows the results of a comparison between matched and mismatched systems in a laboratory environment.

DETAILED DESCRIPTION

Figure 1:
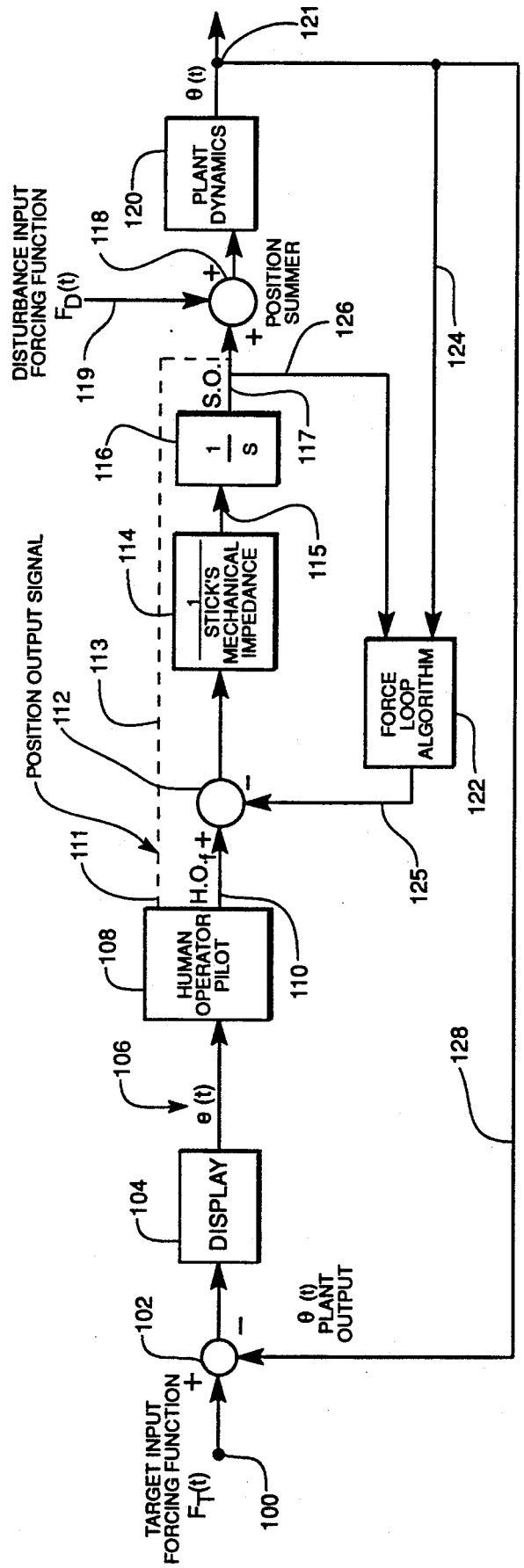
FIG. 1 shows a man-machine system such as an aircraft which embodies the present invention.

FIG. 1 in the drawings shows a block diagram of a generalized controller system which may be used in an aircraft and arranged according to the present invention. The FIG. 1 system includes the human operator or pilot indicated at 108 within one feedback loop. This loop generally includes the path 128 in FIG. 1. The FIG. 1 system also provides an additional or secondary feedback loop which generally includes the path 125 in order to supplement the information available to the human operator or pilot by way of a tactile or feeling based signal that is coupled to the pilot's control stick. This control stick corresponds to the summing node 112 in FIG. 1. The FIG. 1 system therefore includes a target input forcing function signal FT(t) received on the node 100 and coupled to a first summing node 102 from which an error signal is supplied to a visual display 104 where it is observed by the pilot 108, the observed error signal being identified by the symbol e(t) indicated at 106 in FIG. 1.

The pilot 108 in FIG. 1 generates two output signals a force output signal, designated H.O.$_f$, along the path 110 and a position output signal along the path 111. This path 111 is extended by the dotted path 113 to indicate the position output response signal to be the same as the S.O. signal along the path 117.

The human operator or pilot force output signal H.O.$_f$ is applied to the second summing node 112 which is in fact the aircraft control stick. The difference between the pilot force signal and the force signal received along the path 125 from the force loop algorithm 122 is considered to be applied to the mechanical impedance of the control stick indicated at 114 which provides a stick velocity output along the path 115. The stick velocity signal is integrated as indicated by the Laplace transform designated intergrator of block 116 to provide a stick position output signal along the path 117. This signal is in turn applied to a third summing node indicated at 118. This third summing node also receives a disturbance input forcing function $F_D(t)$ along the path 119. The addition or sum of the path 117 and path 119 signals is applied to the plant dynamics of block 120 in order to generate the aircraft position or $\theta(t)$ signal at the node 121.

One of the signals along the path 117 or the path 121 (ie, the stick position output signal or the plant output signal) is applied to a force loop algorithm 122 in order to generate the feedback signal along the path 125. The aircraft position signal or $\theta(t)$ signal may also be called the plant output signal and as indicated is connected to both the block 122 and the summing node 102 by the paths 124 and 128. Signals along the path 128 in FIG. 1 can therefore be referred-to as the position loop signals and signals along the path 125 as the force loop signals. One aspect of the present invention involves the matching of these two signals in influence in order to achieve improved control over the aircraft performance and reduced human operator error tendency. The FIG. 1 control system may generally be described as a "what you see is what you feel" oriented system.

FIG. 1 in the drawings therefore shows a man-machine system such as a pilot controlled aircraft in which the present invention can be embodied. The FIG. 1 system includes as input signals a target input forcing function $F_T(t)$ which is received at the node 100 and also a possible disturbance input forcing function $F_D(t)$ on the path 119. In the FIG. 1 system the human operator may actually be the operator of a vehicle or a pilot flying an aircraft or any other man to machine interaction which requires a controller's response from the human operator. For the sake of simplicity the present description assumes the aircraft and pilot example to prevail.

In the FIG. 1 system then, the aircraft pilot represented by the block 108, observes on a visual display 104, the target input trajectory or target forcing function $F_T(t)$ which may be the aircraft being chased by the pilot's aircraft and the of the pilot's aircraft, which is represented by the assembly for the target input case wherein $F_T(t)$ is not zero and $F_D(t)$ is zero the objective of the pilot 108 is to produce stick commands which appear at 117 in FIG. 1 and are represented by the symbol S.O. herein, such that the position of the pilot's aircraft, the positions represented by the symbol $\theta(t)$ follows $F_T(t)$ with an error e(t) 106 that is small and close to zero. The pilot 108 produces two types of stick outputs, that is stick force and stick position, which are indicated respectively at 110 and 111 in the FIG. 1 drawing. The stick position output from the pilot corresponds with the stick output signal indicated at 117 in FIG. 1 as is indicated by the dotted line 113. The objective of the present invention is to employ the stick controller disclosed in the above identified Repperger patent applications, which are hereby incorporated by reference herein, to achieve a secondary information processor controller according to the FIG. 1 arrangement.

At the force summing node 112 in FIG. 1, the human force output from the pilot 108 is combined with a force signal originating in the force loop algorithm 122 with the resulting force output from the force summing node 112 becoming an input into the mechanical impedance of the stick which is indicated in the block 114. The velocity output of the stick mechanical impedance, which is indicated at 115 in FIG. 1, is integrated in the integration of block 116 to produce a stick output signal at 117 as was indicated earlier. The integration of block 116 is indicated in FIG. 1 in terms of its Fourier transform symbol of 1/s.

The signal S.O. at 117 is one of the inputs to a second or position summing node 118 in the FIG. 1 system. The third summing node 118 therefore accomplishes the summing of position signals. The third summing node 118 also is used as the point of input for the disturbance input forcing function $F_D(t)$ which is received along the path 119 in FIG. 1. Typically the disturbance input or $F_D(t)$ function is a model representation of white noise that is physically taken to wind buffeting of the pilot's aircraft. The pilot 108 is required to track out these buffeting disturbances; they generally appear as random disturbances which can be tracked out using a stick controller which is, in fact, the force summing node 112.

The stick output signal at 117 may be, for example, in the form of a voltage signal that is proportional to stick position and is the signal input to the aircraft dynamics or the plant dynamics which is represented in the block 120. The output signal of the plant dynamics block 120 appears at 121 in FIG. 1 and is, in fact, the $\theta(t)$ or aircraft position signal which is compared to the target input or target input forcing function received at the node 100 into the first summing node 102 to produce the error signal e(t) indicated at 106 in FIG. 1.

One aspect of the present invention therefore is to choose the force loop algorithm indicated at the block 122 in FIG. 1 such that the following relationship occurs:

$$(Stick\ Position\ Output)/(Human\ Force\ Output\ Response) = Plant\ Dynamics = P(s) \quad (1)$$

Equation 1 therefore defines the desired conditions for signal communicating to the algorithm of block 122 by way of the path 126.

For signals communicated along the path 125 in FIG. 1 the following relationship prevails:

$$(Plant\ Output)/(Stick\ Position\ Output) = /Plant\ Dynamics = P(s) \quad (1a)$$

Further developments of the algorithms defined by equations 1 and 1a is disclosed below herein.

Figure 2:
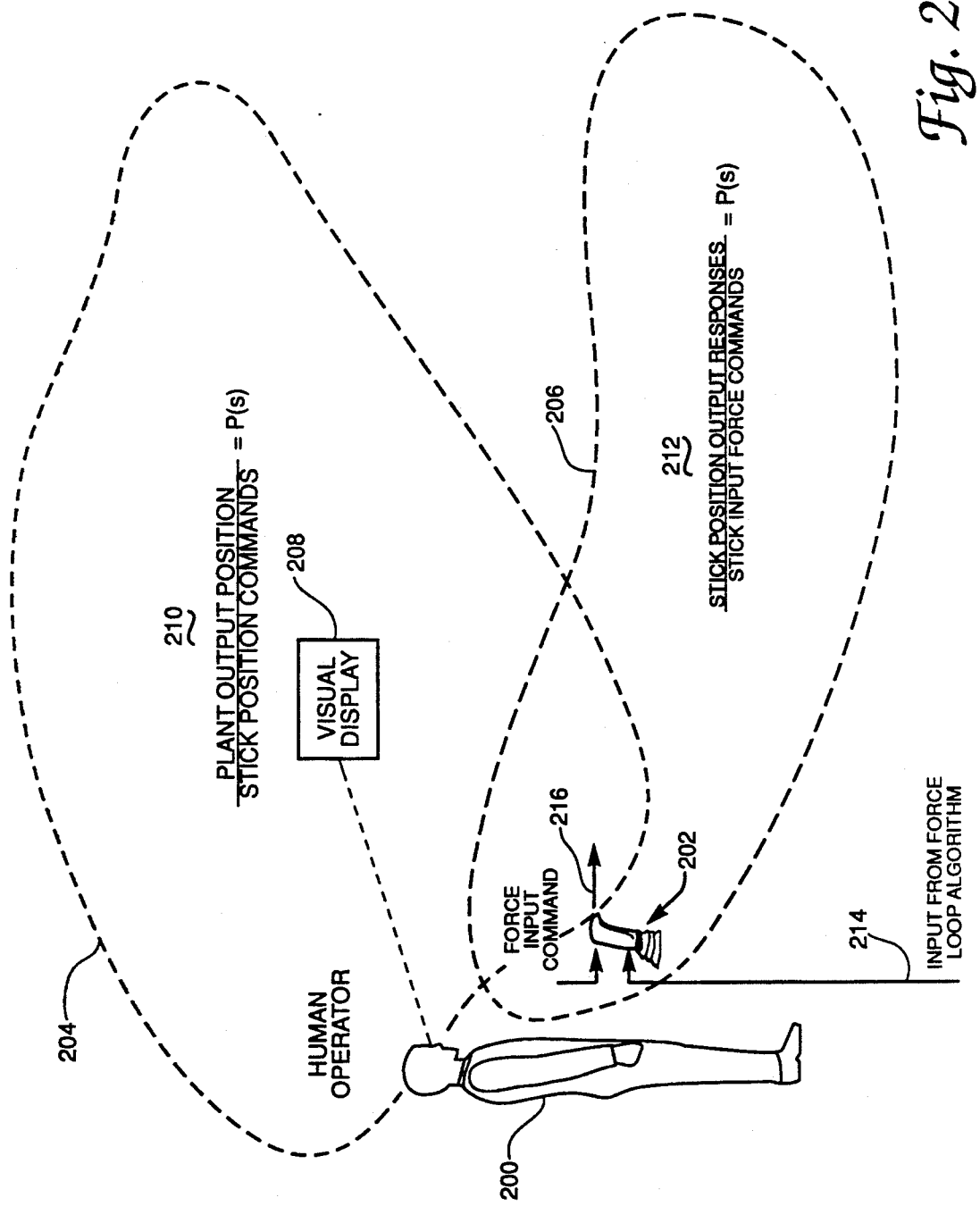
FIG. 2 illustrates the secondary information processor controller concept.

FIG. 2 in the drawings illustrates another aspect of the present invention in conceptual form. According to this aspect the algorithms resulting from the concepts 204 and 206 that is the equations shown at 210 and 212 in FIG. 2 are to be matched in influence on the aircraft controller system.

In FIG. 2, the human operator pilot is shown at 200 and the control stick operated by the pilot is shown at 202 and the visual display observed by the pilot is shown at 208. In addition to the concepts represented at 204 and 206 in FIG. 2 and the equations 210 and 212 corresponding to these concepts, FIG. 2 also shows the path 214 by which the force signal from the force algorithm 125 in FIG. 1 is applied to the control stick 202.

The control stick 202 is in effect the force summing node 112 in FIG. 1. The FIG. 2 drawing is intended to convey the principle that the transfer function relating what you visualy see (210) is identical to the transfer function relating what you feel (212).

In FIG. 2 therefore, the position related transfer function indicated by the equation 210, and based on observation of the display 208 by the pilot 200, is preferably matched in effect with the force transfer function originating in the force algorithm 122 in FIG. 1 and received along the path 214 in FIG. 2. An aspect of the present invention therefore is the addition of the "feel" concept 206 and the feel transfer function 212 as secondary information to the normal vision or "see" related transfer function of equation 210 with the two inputs or "feeling" and "seeing" being matched in effectiveness.

Four specific arrangements of the FIG. 1 control system may be considered to additionally appreciate the invention. These specific arrangements consider the feedback signals that are physically practical in the FIG. 1 system. The first of these specific arrangements is shown in FIG. 3 and the remaining three in FIGS. 4-6 herein.

Figure 3:
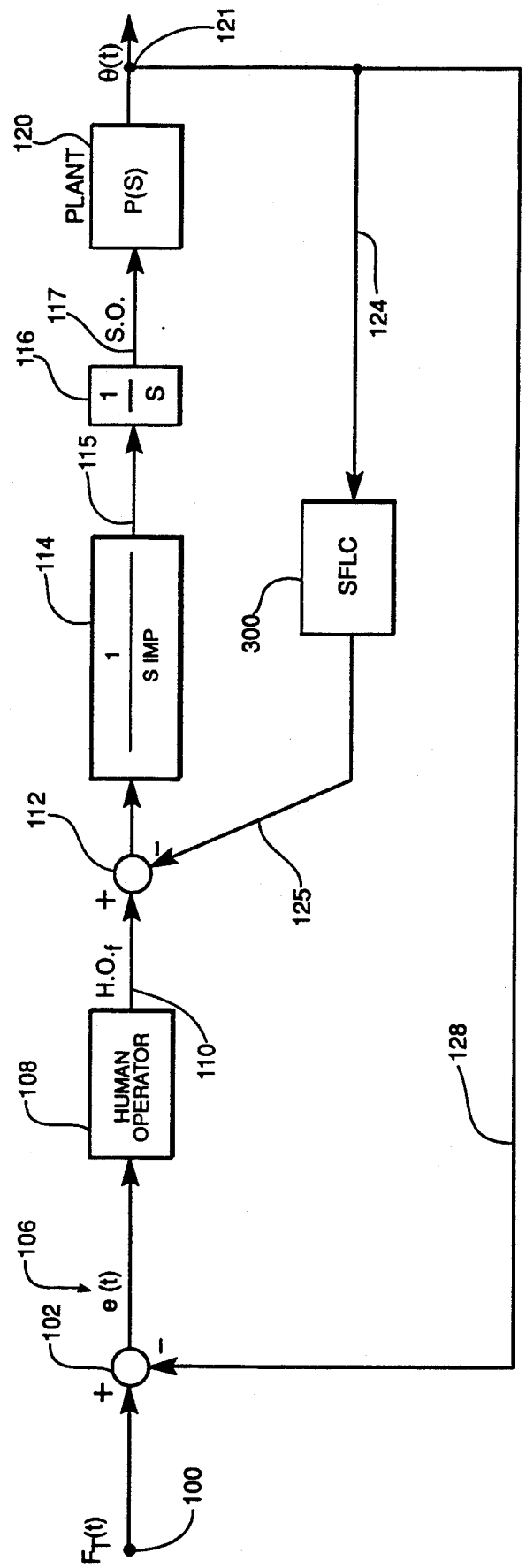
FIG. 3 shows another arrangement of the FIG. 1 system according to the present invention when $F_D(t) = 0$.

In the FIG. 3 specific arrangement the disturbance input forcing function $F_D(t)$ has a value of zero and only the target input $F_T(t)$ is of nonzero value. In the FIG. 3 representation of this arrangement of this invention the elements shown in FIG. 1 are reproduced along with their FIG. 1 identification numbers with certain of the FIG. 1 elements being omitted as is appropriate for the $F_D(t)$ input being of zero value. Other of the FIG. 1 blocks, notably the block 300 in FIG. 3 are reassigned new numbers in the FIG. 3 sequence, in response to the changed specific nature required in FIG. 3.

In the FIG. 3 specific arrangement the plant transfer function of the block 120 is replaced by the symbol P(s), the stick impedance is noted as S IMP, the stick position output by the symbol S.O. while e(t) is the display error signal and is the difference between the target projectory $F_T(t)$ and the plant position output $\theta(t)$. The $\theta(t)$ position output of the plant represents the pilot's aircraft position heading. The human operator has an output the signal H.O.$_f$ indicating his force output which is directly applied to the control stick or force summer 112 in FIG. 3. Since the control stick mechanical impedance, S IMP is the ratio of force to velocity then it is possible to state that $$(Stick\ Velocity)/(Resulting\ Force\ Input) = 1/(S\ IMP) \quad (2)$$

$$(Stick\ output) = (1/s).Stick\ Velocity \quad (3)$$

Equations 2 and 3 and several of the equations following herein are expressed in Laplace transform quantities wherein stick position is determined from the integral of the stick velocity assuming zero initial conditions.

Considering that the human operator senses only his force output and the position of his hand, which is coincident with the S.O. (t) signal at 117 in FIG. 3, then the transfer function sensed by the human operator is defined by $$(S.O.)/H.O._f = (Stick\ Position\ Output)/(Human\ Operator\ Force\ Output) \quad (4)$$

If the well known relationship $$C(s)/R(s) = G(s)/(1 + [G(s)\ H(s)]) \quad (5)$$

is applied to equation 4 then the relationship $$\theta/(H.O.f) = ([1/(S\ IMP.s)]P)/(1+[1/(S\ IMP.s)].P.SFLC) \quad (6)$$

Where SFLC is the transfer function of block 300 in FIG. 3. But $\theta(s) = [S.O.].P(s)$ so that $$[S.O..P(s)/[H.O.f] = ([1/(S\ IMP.s)].P(s))/(1+[1/(S\ IMP.s)].P.SFLC) \quad (7)$$

Dividing both sides of equation (7) by P(s) and multiplying both the numerator and denominator by [s(S IMP)] yields:

$$[S.O.]/[H.O.f] = 1/(s.S\ IMP + P.SFLC) \quad (8)$$

If the plant transfer function P(s) and S IMP are fixed, which occurs in practice, then the objective is to pick SFLC such that:

$$[S.O.]/[H.O.f] = P(s) = 1/[s.S\ IMP + P.SFLC] \quad (9)$$

which implies that:

$$SFLC = [1/P^2 - (s.S\ IMP)/P] = 1/P^N[1/P - S.S\ IMP] \quad (10)$$

where N is a feedback determination variable having possible values of zero and one, and has a value of one in this instance. The choice of SFLC shown in equation (10) ensures that the relationship S.O./H.O.f matches the plant P(s) and equation (9) is satisfied and the relationship specified by equation (1) is true.

Figure 4:
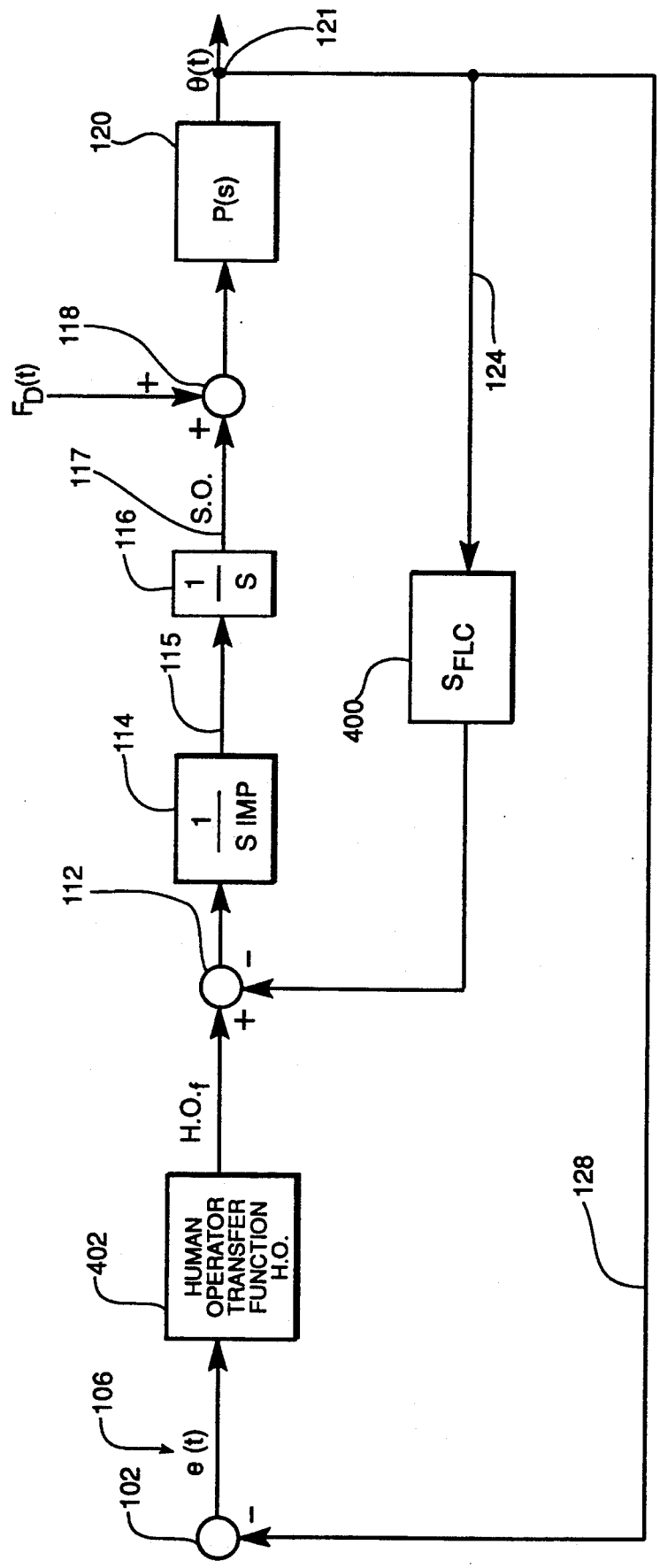
FIG. 4 shows a different arrangement of the FIG. 1 system according to the present invention when $F_T(t) = 0$.

FIG. 4 illustrates the second specific arrangement of FIG. 1 considered herein and is similar to FIG. 3 except that in FIG. 4 the target input forcing function $F_T(t)$ is zero and the disturbance input forcing function $F_D(t)$ is not zero. The transfer function S $_{FCL}$ is more difficult to accomplish because the transfer function H.O., of the human operator in block 402, is part of the SFLC realization. Parenthetically, it is noted that in the Human Operator Transfer Function (H.O. = H.O.f/e(t)) the term H.O.f represents the force output signal of the human operator.

In FIG. 4 since:

$$S.O. = (1/[S\ IMP])\ [H.O.f - S\ FLC.\theta]\ (1/s) \quad (11)$$

and $$H.O.f = (H.O.)(-\theta) \quad (12)$$

it is implied that $$S.O. = (1/[S\ IMP])\ [H.O.f - S\ FLC\ (-H.O.f/H.O.)]\ (1/s) \quad (13)$$

therefore $$[S.O.]/[H.O.f] = 1/[S\ IMP.S]\ [1 + S\ FCL/H.O.] \quad (14)$$

to set this equal to P(s), as in equation (9), implies that:

$$[S.O.]/[H.O.f] = P(s) = (1/[S\ IMP.s])(1 + S\ FCL/H.O.] \quad (15)$$

or $$S\ FLC = H.O.[s.P(s).S\ IMP - 1] \quad (16)$$

Equation 16 is difficult to realize in practice because the quantity H.O. is adaptable and changes with conditions. The alternate feedback path 126 in FIG. 1 may be used to avoid this difficulty as shown for the third specific arrangement of the FIG. 1 system below.

Figure 5:
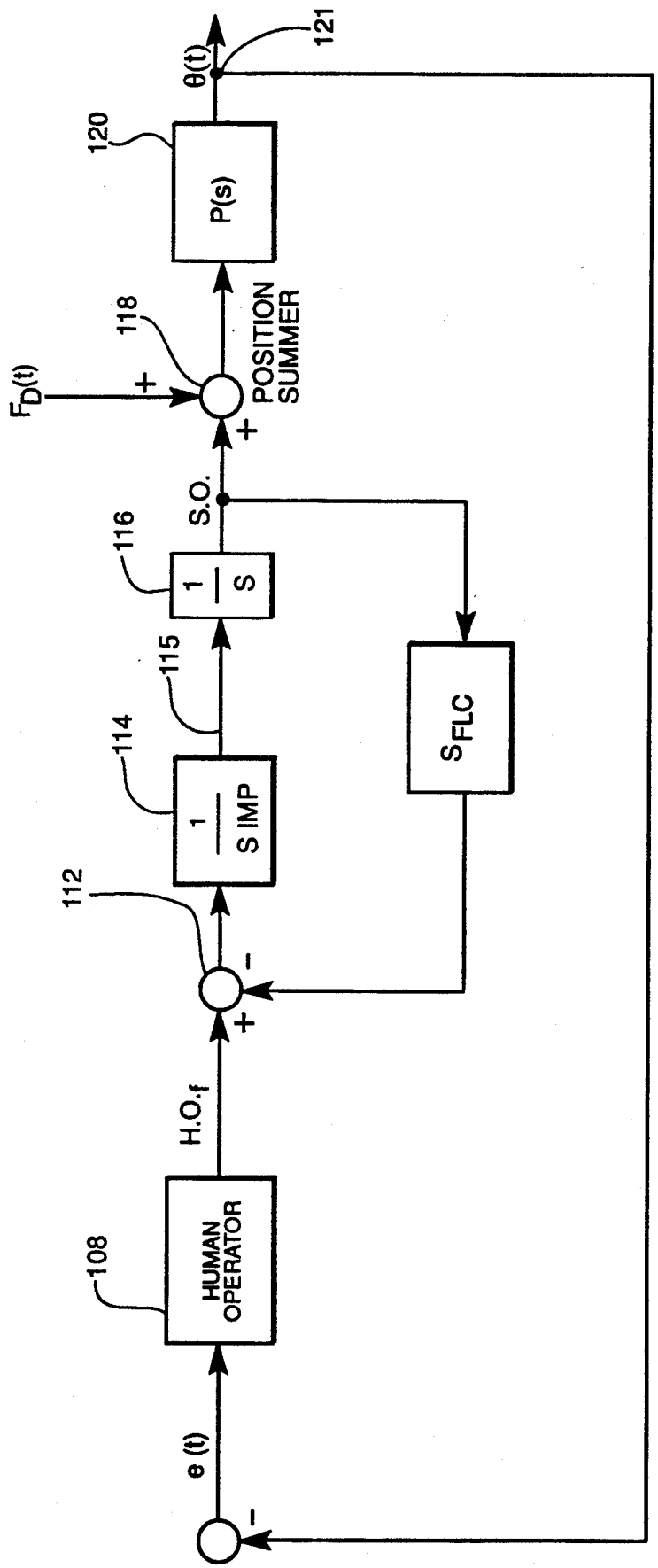
FIG. 5 shows yet another arrangement of the FIG. 1 system according to the present invention when $F_T(t) = 0$.

In this third arrangement the stick position output S.O. is fed back to the block 122 transfer function instead of using the plant dynamics output and the signal $\theta$. Technically this is a much simplified case but in practice only $\theta$ and S.O. are easily measured variables. So that as shown in FIG. 5:

$$[S.O.]/[H.O.f] = 1/(s.S\ IMP)]/(1+[1/(S.S\ IMP)]S\ FLC) \quad (17)$$

and to have this be equal to the plant P(s) requires:

$$P(s) = [1/(s.S\ IMP)]/[1+(1/[s.S\ IMP])\ S\ FCL] \quad (18)$$

again, if P(s) and S IMP are fixed, then:

$$S\ FLC = (1/P) - s.SIMP \quad (19)$$

which can easily be obtained in practice.

Figure 6:
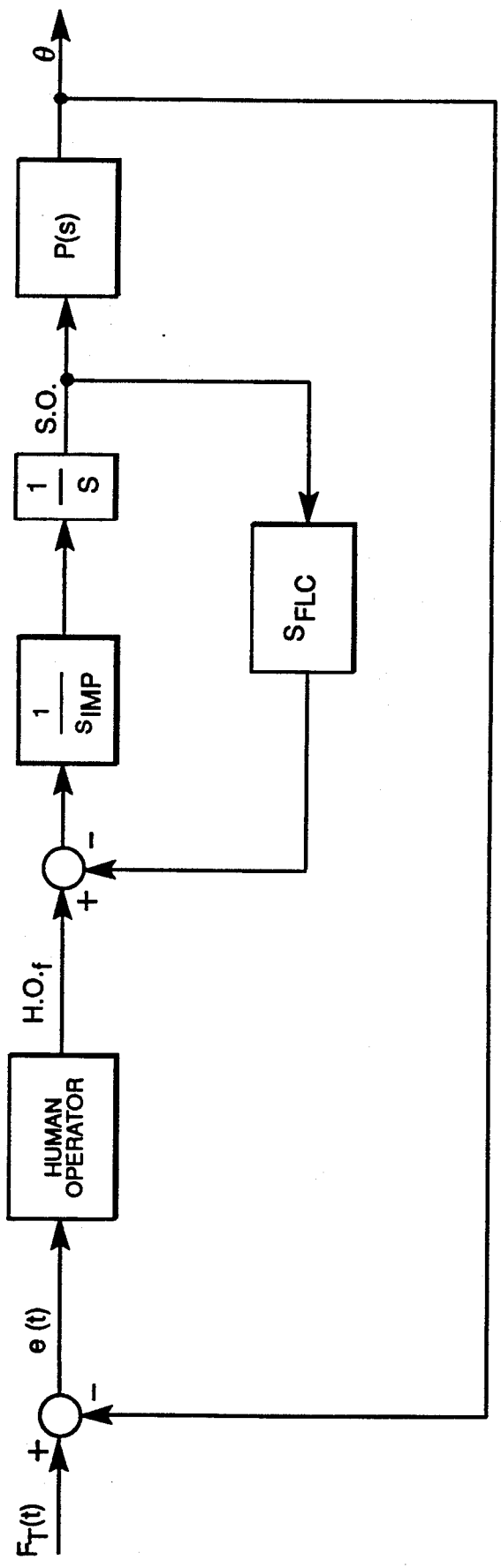
FIG. 6 shows yet another arrangement of the FIG. 1 system according to the present invention $F_D(t) = 0$.

FIG. 6 in the drawings illustrates the fourth specific arrangement to be considered, an arrangement where $F_D(t) = 0$ and the S.O. measured variable is used to drive the secondary loop algorithm 122.

Solving $$[S.O.]/[H.O.f] = 1/(s.S\ IMP)/(1+[1/(s.S\ IMP)]\ S\ FLC) \quad (20)$$

to have this ratio equal to P(s) implies:

$$P(s) = [1/(S.S\ IMP)]/(1+[1/(s.S\ IMP)]\ S\ FLC) \quad (21)$$

Solving for S FLC again implies:

$$S\ FLC = (1/P) - s.S\ IMP \quad (22)$$

which is similar to the last specific arrangement and equation (19). Thus arrangements 3 and 4 are easily to implement in practice.

Both equations (19) and (22) can therefore be written in the form of $$S\ FCL = 1/P^N\ [(1/P) - S.S\ IMP] \quad (22a)$$

As was previously accomplished in equation 10 above—with the variable N having a value of zero in the instance of equations 19 and 22. The variable N and rewriting of these equations in this form therefore enables the three versions of the FIG. 1 transfer function 122 developed in three of the specific examples to be characterized by a single mathematical expression in which changing the variable N between its two possible values of zero and one accommodates selection of the differing alternate feedback paths 124 and 126 in FIG. 1.

Figure 7:
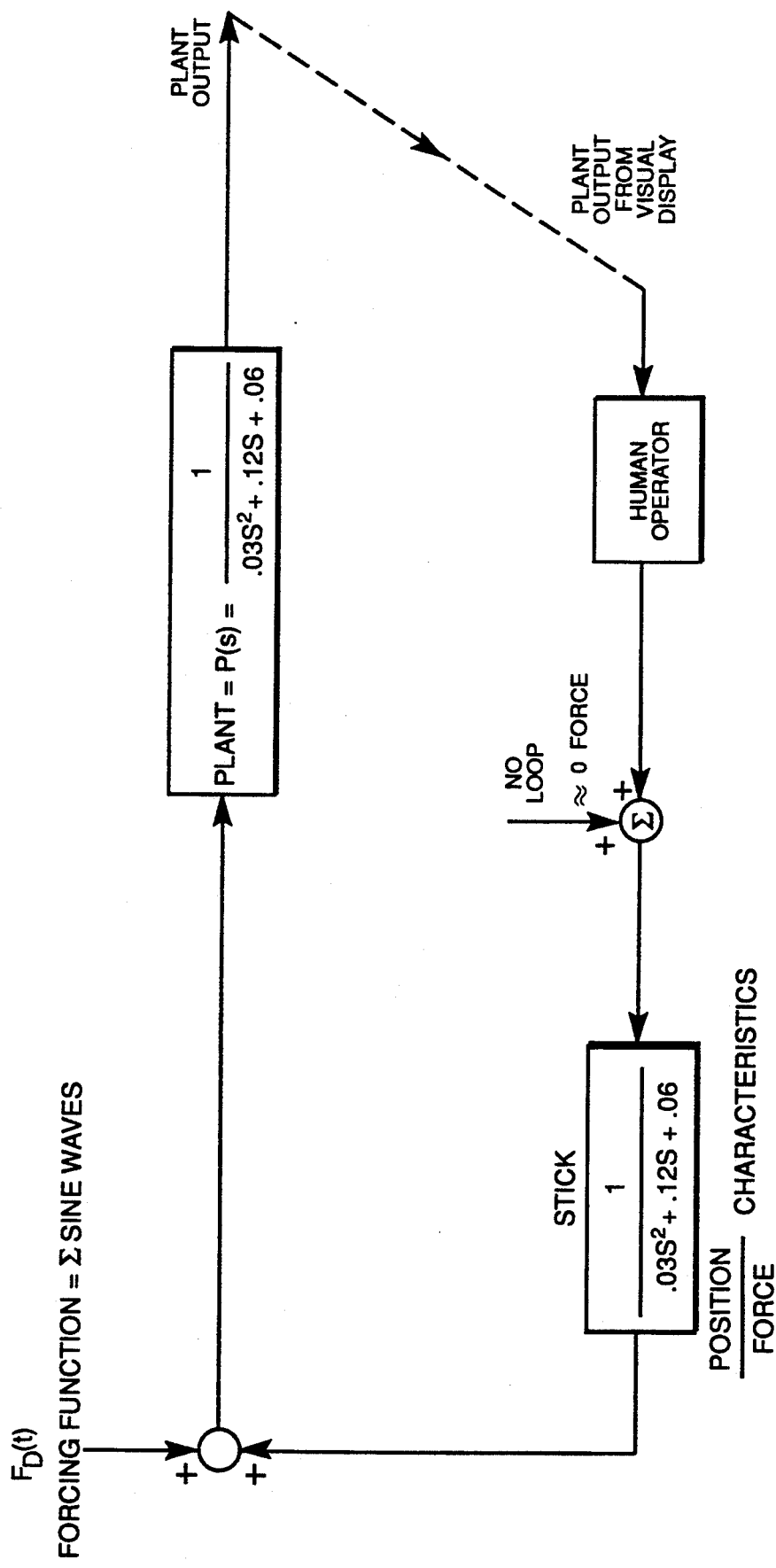
FIG. 7 shows a numerical example of the FIG. 5 system wherein the position and force feedback path are matched.

An example illustrates the third specific arrangement to be considered. The control system for this example is shown in FIG. 5 and FIG. 7 illustrates numerical values for this FIG. 5 third specific arrangement of the invention—a situation wherein the plant dynamics P(s) are identical to the force-displacement characteristics of the control stick—i.e. a "matched" condition for the position and force feedback loops of the paths 125 and 128 in FIG. 1. In this example:

$$P(s) = 1/[(0.3)s^2 + (0.12)\ s + (0.06)] = Position/Force \quad (23)$$

is identical to the characteristics of the stick controller.

It was noted in the technical paper by A. Morris and D. W. Repperger, "Describing Functions of The Man-Machine With an Active Controller", Proceedings of The Annual Conference on Manual Control, May 1986 which is hereby incorporated by reference herein that the position-force characteristics of the control stick are described as in equation (23). This means, in the time domain and under steady state conditions that:

$$F = M\ddot{x} + B\dot{x} + Kx \tag{24}$$

where the symbol and dot indicate second and first time differentiations ($d^2/dt^2$ and $d/dt$) respectively. For the FIG. 7 example stick, M=0.03 Newtons (seconds)/²(Radians), B=0.12 Newton Second/Radian, and K=0.06 Newtons/Radian and the plant transfer function is of the same characteristics.

Figure 8:
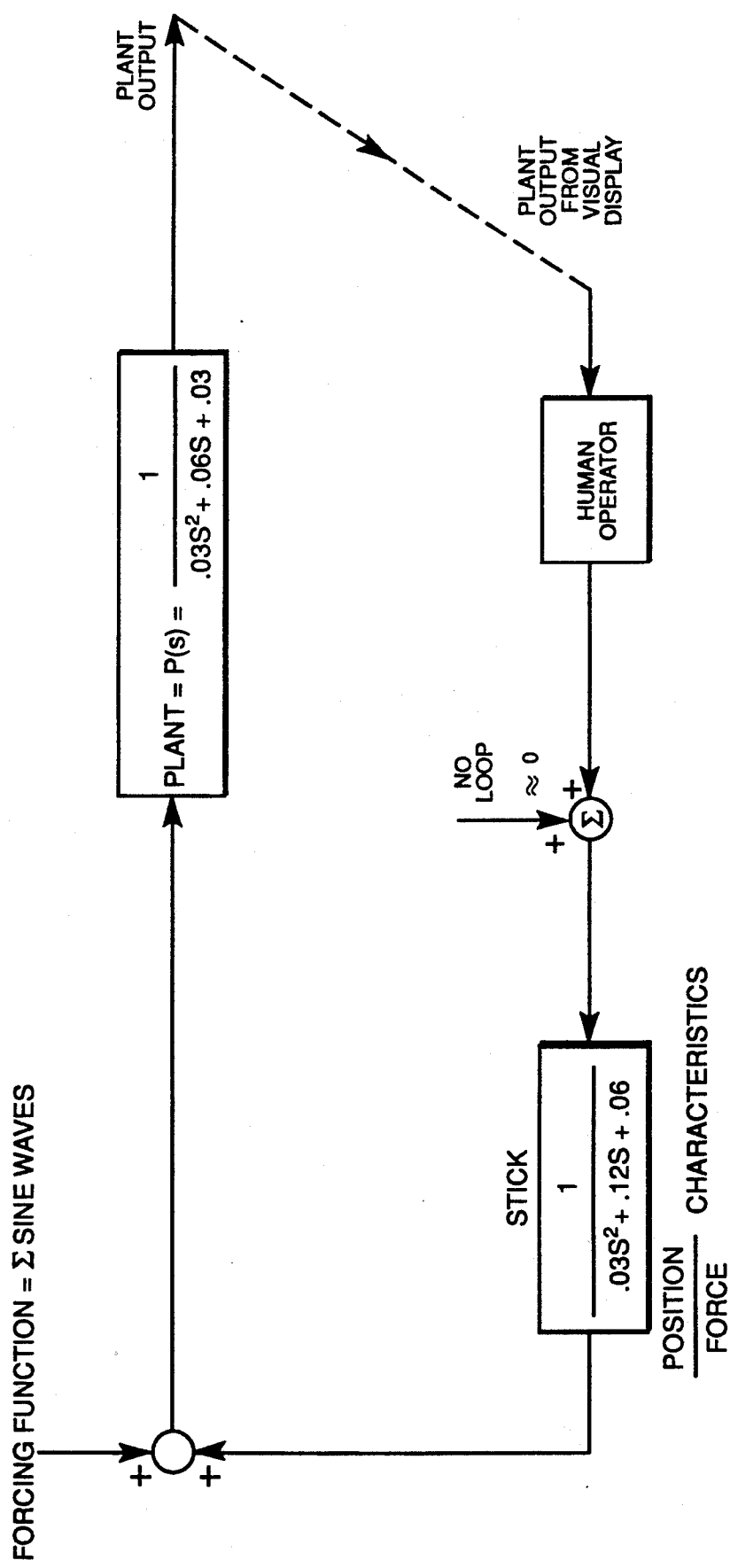
FIG. 8 shows a numerical example of the FIG. 5 system wherein the position and force feedback path are mismatched.

FIG. 8 in the drawings illustrates the contrasting mismatched case in which the position-force cues resulting from the interaction of the plant and the stick are different from the cause-effect relationship of the plant's input-output characteristics. In this FIG. 8 example, the stick does not "feel" similar to the way the plant dynamics act. In FIG. 7, when the stick "feels" (In a force position-sense) similar to the transfer function P(s), the tracking error e(t) is much less as is illustrated in FIG. 9; this achieves much lower values of root means square error e(t). In FIG. 8, however, when the stick feel (in a force-position sense) is different from the transfer function p(s), the tracking error is much greater, as indicated in FIG. 9.

FIG. 9 illustrates the averaged tracking error performance scores of four subjects, sufficiently motivated and trained to the task of controlling an aircraft with a matched and mismatched secondary information tactile feedback controller system according to the invention. From FIG. 9 it is clear that when the stick characteristics match the plant characteristics, then human tracking performance improves—ie the RMS tracking error decreases from a mean value of about 55 to 35 between the mismatched and matched cases (even though the spreads of error value are greater in the matched example). A technique for measuring root mean square error in the FIG. 9 type of human performance situation is disclosed in my issued U.S. Pat. No. 4,619,506 which is also hereby incorporated by reference herein.

Although this invention has been described using a stick controller, it can easily be extended to the steering wheel of a car, the controller for a boat, or any other man-machine device in which the vehicle is controlled by a human through some interface controller and by using arms, legs, or by some other interaction. The herein described apparatus therefore provides the operator of a vehicle with another model of the task he is tracking. By using the human proprioceptive senses such as position displacement and force, the vehicle control stick emulated the plant characteristics or task dynamics being tracked. It provides another cause-effect relationship felt through force input and stick position output commands of the stick controller, related to the task the human is dealing with. Using the invention the human tracker can perform better with less tracking error and learn a task more quickly. The device acts as a secondary source of information to give to the human operator another method of understanding the task he is controlling by feeling a similar cause-effect relationship with his hand position-force senses. It can be used with aircrafts, cars, boats, or other systems under operation by humans.

While the apparatus and method herein described constitute a preferred embodiment of the invention, it is to be understood that the invention is not limited to this precise form of apparatus or method, and that changes may be made therein without departing from the scope of the appended claims.

We claim:

1. An aircraft flight controller system providing a human operator with visual primary flight control information and tactile secondary flight control information supplementary to the visual primary flight control comprising the combination of:

a primary information human operator vision based and noise input forcing function $f_D(t)$ signal inclusive closed feedback loop aircraft dynamics plant controlling apparatus, said apparatus including, an aircraft dynamics plant means output, $\theta(t)$ signal, to target input forcing function, $F_T(t)$ signal, difference error based visual display having plant position display e(t) signal, output to said human operator, a human operator force and secondary information tactile feedback force operated control stick including a predetermined stick mechanical impedance characteristic and integration means for converting stick velocity signals to stick position signals, and aircraft dynamics plant for generating said output $\theta(t)$ signal, said aircraft dynamics plant means including said $F_D(t)$ noise forcing signal as an input thereto;

a secondary information tactile signal feedback path having said aircraft dynamics plant means output $\theta(t)$ signal and said control stick position output signal as inputs thereto, and a secondary information force signal output connected with said control stick, and a transfer function defined by the mathematical relationship $$1/P^N (1/P - s.S\ SIMP)$$

wherein

P represents the aircraft dynamics plant transfer function

N represents a feedback determination variable having possible values of zero and one, s represents the Laplace transform operator, and S IMP represents the impedance of said control stick.

2. The aircraft flight controller system, of claim 1 wherein said $F_D(t)$ noise disturbance input forcing function is of zero magnitude and said variable N has a value of one;

whereby said secondary information tactile signal feedback path transfer function is defined by the mathematical relationship $1/P^2 - (s\ SIMP)/P$.

3. The aircraft flight controller system, of claim 1 wherein said target input forcing function $F_T(t)$ signal is of zero magnitude and said variable N has a value of zero;

whereby said secondary information tactile signal feedback path transfer function is defined by the mathematical relationship $(1/P - s.S\ IMP)$.

4. The aircraft flight controller system of claim 1 wherein said $F_D(t)$ noise disturbance input forcing function is of zero magnitude and said variable N has a value of zero;

whereby said secondary information tactile signal feedback path transfer function is defined by the mathematical relationship (1/P−s.S IMP).

5. The aircraft flight controller system of claim 1 wherein said $F_D(t)$ noise disturbance input forcing signal is comprised of aircraft wind buffeting determined signal components.

6. The aircraft flight controller system of claim 5 wherein said $F_D(t)$ noise disturbance input forcing signal is comprised of white noise determined signal components.

7. The aircraft flight controller system of claim 1 wherein said aircraft dynamics plant means output $\theta(t)$ signal is representative of a position output signal from said flight controller system.

8. The aircraft flight controller system, of claim 1 wherein said control stick has a voltage output signal that is proportional to stick position.

9. The aircraft flight controller system of claim 1 wherein said target input forcing function $F_T(t)$ signal is representative of the target input trajectory of a second aircraft, an aircraft being chased by said flight controller system aircraft.

* * * * *

UNITED STATES PATENT AND TRADEMARK OFFICE
CERTIFICATE OF CORRECTION

PATENT NO. : 5,062,594

DATED : November 5, 1991

INVENTOR(S) : Daniel W. Repperger

It is certified that error appears in the above-identified patent and that said Letters Patent is hereby corrected as shown below:

Col 4, line 48, -- position -- should follow the first "the".
Col 10, line 58, "(s SIMP)" should read -- (s · SIMP) --.

Signed and Sealed this

Ninth Day of March, 1993

Attest:

STEPHEN G. KUNIN

Attesting Officer

Acting Commissioner of Patents and Trademarks